United States Patent [19]

Mino et al.

[11] Patent Number: 4,472,749
[45] Date of Patent: Sep. 18, 1984

[54] CONSTANT SPEED REEL DRIVEN MAGNETIC TAPE IN CUE OR REVIEW MODE

[75] Inventors: Mineo Mino, Hirakata; Kazuhiro Yamanishi, Higashiosaka; Keiichiro Tsuruoka, Hirakata, all of Japan

[73] Assignee: Matsushita Electric Industrial Co., Ltd., Osaka, Japan

[21] Appl. No.: 322,246

[22] Filed: Nov. 17, 1981

[30] Foreign Application Priority Data

Nov. 17, 1980 [JP] Japan .................. 55-162446

[51] Int. Cl.³ .................................. G11B 19/24
[52] U.S. Cl. ...................................... 360/73
[58] Field of Search .......................... 360/73

[56] References Cited

U.S. PATENT DOCUMENTS

| | | | |
|---|---|---|---|
| 3,582,743 | 6/1971 | Diaz et al. | 360/73 |
| 3,808,360 | 4/1974 | Tatsuguchi | 360/73 |
| 3,959,815 | 5/1976 | Rotter et al. | 360/73 |
| 4,004,205 | 1/1977 | Yamamoto et al. | 360/73 |
| 4,163,532 | 8/1979 | Sakai | 360/73 |
| 4,249,220 | 2/1981 | Yasutake et al. | 360/73 |
| 4,296,446 | 10/1981 | Zorbalas | 360/73 |

OTHER PUBLICATIONS

IBM Technical Disclosure Bulletin, vol. 14, No. 8, Jan. 1972, pp. 2331-2332, Reel-to-Reel Tape Unit with Decreased Acceleration Time, Kollar et al.
Systems International, Dec./Jan. 1978, pp. 23-26, vol. 5, No. 10, Economy of Design in a Digital Cassette Drive, D. Cutler.

Primary Examiner—George G. Stellar
Attorney, Agent, or Firm—Wenderoth, Lind & Ponack

[57] ABSTRACT

A magnetic tape reproducing apparatus in a rotary head VTR is arranged such that when reels are rotatably driven to perform a cue play and a review play, the speed of a motor driving the reels is controlled by a speed control of the motor itself and in accordance with a control signal reproduced from a magnetic tape, thereby making the speed of the magnetic tape approximately constant during the cue play and the review play.

9 Claims, 9 Drawing Figures

CONSTANT SPEED REEL DRIVEN MAGNETIC TAPE IN CUE OR REVIEW MODE

BACKGROUND OF THE INVENTION

This invention relates to a magnetic tape reproducing apparatus suitable for performing a cue play and review play in a helical scanning VTR, and more particularly to a motor control circuit which makes the speed of the magnetic tape approximately constant during the cue play and the review play, by controlling the rotational speed of a motor used for driving reels.

Conventionally, in a helical scanning VTR, a capstan motor rotates at a high speed during the cue play and the review play so that a capstan motor and pinch roller are driven by the motor to drive a magnetic tape. At that time, another motor is mounted on a reel and is also controlled, which makes a control circuit complicated since it must control two separate motors.

SUMMARY OF THE INVENTION

In the light of the above problem, the present invention has been so designed that one motor drives the reels to enable a smooth cue play and review play.

An object of the invention is to provide a magnetic tape reproducing apparatus in the helical scanning VTR, which is novel and optimum for carrying out the cue play and review play.

Another object of the invention is to provide a motor control used to regularize the tape speed regardless of a diameter of the wound tape on the reel.

These objects can be actually obtained by use of a magnetic tape reproducing apparatus of construction shown schematically below. The magnetic tape reproducing apparatus of the present invention provides a reel base for winding the magnetic tape, a motor whose rotational speed is controllable for driving the reel base, a detecting means for detecting the rotational speed of the motor, a magnetic head for reproducing a control signal recorded on the magnetic tape, a conversion means which detects the frequency of the control signal to convert it into a voltage or current, and an adding means for adding a motor speed information signal obtained from the conversion means and a speed signal of the control signal obtained from the conversion means, the signal obtained from the adding means is fed to the motor so as to form a speed control loop, thereby controlling the magnetic tape in constant speed, thus enabling a smooth cue play and review play.

BRIEF DESCRIPTION OF THE DRAWINGS

These and other objects of the invention will be more apparent from the following description in accordance with the accompanying drawings in which.

DESCRIPTION OF THE PREFERRED EMBODIMENTS

Figure 1:
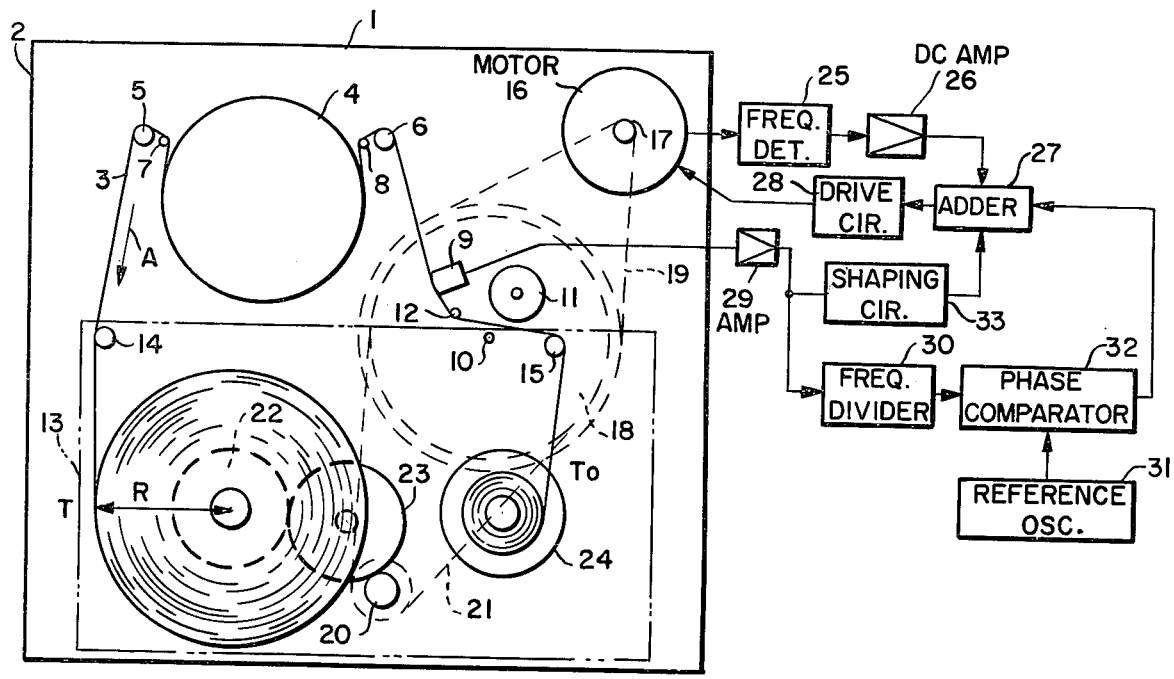
FIG. 1 is a plan view including a block diagram in a principal portion of an embodiment of a magnetic tape reproducing apparatus according to the present invention.

FIG. 1 is a plan view of an embodiment of a magnetic tape travel system of the present invention, including a block diagram in part, in which a mechanical unit 1 of a magnetic tape reproducing apparatus includes parts mounted vertically on a single chassis 2. FIG. 1 shows a reviewing condition during the playback, in which a magnetic tape 3 travels in the direction of the arrow A and is wound onto a reel base 22 which is normally the tape-feed side; a rotary magnetic head unit 4 is provided in the path of the travelling magnetic tape 3 in order to reproduce video signals recorded on the magnetic tape 3 and having guide pins 5, 6, 7 and 8 for winding the magnetic tape 3 onto the magnetic head unit 4; the magnetic tape 3 is adapted to be fed from a reel base 24 which is normally the winding-up side. A control head 9 is provided in the path of the magnetic tape 3 for reproducing the control signal which has been previously recorded on the magnetic tape 3; a capstan 10 and a pinch roll 11 serve to feed the magnetic tape 3 at constant speed during a normal playback. In FIG. 1, since the tape 3 is driven by reel 22, the capstan 10 and pinch roll 11 are not kept in contact with the tape 3, a guide 12 being provided to keep proper contact between the magnetic tape 3 and the control head 9. In addition, the reels and other parts are housed within a cassette 13, the interior of which is clearly shown, the cassette 13 providing therein guide pins 14 and 15 by which the magnetic tape 3 is guided as shown.

Next, the rotary drive of reel base 22 will be detailed. In the embodiment, a motor 16 used for providing a rotary-driving force to reel base 22 is of a type which is also usable as a capstan motor. Namely, a shaft 17 (or pulley) of motor 16 is linked with a capstan wheel 18 through a belt 19 and with a pulley 20 by a belt 21 through capstan wheel 18, the pulley 20 transmitting its rotation to reel base 22 through an idler 23, which keeps reel base 22 apart from pulley 20 during the normal playback.

Thus, upon transmitting the rotational drive force from motor 16 to reel base 22, the magnetic tape 3 is wound onto reel 22 in the direction of the arrow A, wherein, for example, assuming that the motor 16 rotational speed in constant, the tape speed of magnetic tape 3 is slow at the beginning of winding thereof and faster at the end of the same due to an increase in the diameter of the wound tape, which is troublesome for the tape-winding. In the diameter of the wound magnetic tape 3 at reel base 22 is represented by R and the tension by T, then a torque $\tau$ necessary for driving reel base 22 is represented by the following formula:

$$\tau = RT \quad (1)$$

The torque $\tau$ differs from that imposed directly on motor 16, but may be deemed proportional to the direct torque, whereby the following description will assume torque $\tau$ in formula (1) to be the motor torque.

Generally, the torque—rotational speed characteristic (to be hereinafter called the S-T characteristic) of a servo motor like a DC motor, where motor 16 is constant-voltage-driven, is represented by a line $a_0$ in FIG. 2. If the minimum diameter of the magnetic tape 3 wound on reel base 22 is represented by $R_s$ and the maximum diameter represented by $R_L$, a winding torque $\tau_s$ for $R_s$ and a torque $\tau_L$ for $R_L$ are obtained by the following equations:

$$\tau_s = R_s T_s \quad (2)$$

$$\tau_L = R_L T_L \quad (3)$$

The following equation holds between the tension T at the reel base 22 side and that $T_0$ at the reel 24 side:

$$T = \alpha T_0 \quad (4),$$

where $\alpha$: a tension increase factor given to the tape travel line: Tension $T_0$ at the reel base 24 side is also determined by a diameter $R_x$ of the magnetic tape 3 wound on reel base 24 and by a load torque $\tau_x$ fed to the reel shaft; then, $T_0$ is obtained by:

$$T_0 = \tau_x / R_x \quad (5).$$

By substituting equation (4) into (5), the equation:

$$T = \alpha \tau_x / R_x \quad (6)$$

is obtained, where $\alpha \tau_x$ is approximately constant. Hence, if $\alpha \tau_x$ is replaced by K, then equation (2) and (3) are arranged as follows:

$$\tau_s = K R_s / R_{xL} \quad (7)$$

$$\tau_L = K R_L / R_{xS} \quad (8)$$

If the rotational speed of reel base 22 corresponding to torques $\tau_S$ and $\tau_L$ are respectively represented by $N_{0-1}$ and $N_{0-2}$ (in S-T characteristic $a_0$ during no control) then, tape speed $V_L$ at the maximum diameter of the wound tape and the speed $V_S$ at the minimum diameter are obtained by the following equations:

$$V_L = 2\pi N_{0-2} R_L \quad (9)$$

$$V_S = 2\pi N_{0-1} R_S \quad (10)$$

In addition, characteristic $a_0$ is the original S-T characteristic of the motor itself. In order to get $V_L = V_S$, the equation:

$$\frac{N_{0-2}}{N_{0-1}} = \frac{R_S}{R_L} \quad (11)$$

should hold. Hence, a motor should be made to satisfy the equation (11). The motor 16 will be available when used only for the above function, but in consideration of its use in other than the usual playback, recording, usual review play, or fast foward, a motor having original S-T characteristic $a_0$ which is not satisfactory for the condition of equation (11) may be rather better for such use. The present invention can obtain $V_S = V_L$ even with a motor which is not satisfactory for the equation (11).

A principle of the present invention is that the rotational speed $N_{0-2}$ for the maximum diameter of the wound tape is set in order to obtain the tape speed V necessary in consideration of the original S-T characteristic $a_0$ of the motor so that the S-T characteristic in dotted lines passing through the point P where $\tau_L$, $N_{0-2}$ and $a_0$ intersect, are obtained so as to thereby allow the rotational speed $N_{0-1}$ for the minimum diameter of wound tape to meet the condition of equation (11). The characteristics $a_1, \ldots, a_n, \ldots, a_\infty$ shown in the dotted lines are obtainable by carrying out the speed control of motor 16 and changing the loop gain of the speed control. Next, this point will be detailed in the following description. In addition, the dotted lines in FIG. 2 can be given suitable characteristics other than those shown, by changing the loop gain.

At first, the speed control of motor 16 will be described. Motor 16 is provided with a frequency generator (to be hereinafter called FG) which indicates the motor rotational speed. A signal from FG is fed to a frequency detector 25, the speed information is converted into a voltage (or current) variation, and the signal is further fed to and amplified by a DC amplifier 26 whose gain is adjustable, and thereafter fed to an adder 27. The signal is further fed to a drive circuit 28 for the motor 16, thereby forming a control loop for motor 16 of FG→frequency detector 25→DC amplifier 26→adder 27→drive circuit 28→motor 16, where the gain of the DC amplifier 26 is set so that various characteristics shown by the dotted lines in FIG. 2 are obtainable. The characteristics are expressed by the following equation:

$$N = -(N_n - N_{0-2})\tau/\tau_L + N_n \quad (12),$$

where $N_n$: $N_1, N_2, N_3 \ldots$. The rotational speed $N_S$ for $\tau_S$ is obtained from equation (12) as:

$$N_S = -(N_n - N_{0-2})\tau_S/\tau_L + N_n \quad (13).$$

The requirement for $V_L = V_S$ is:

$$N_L R_L = N_S R_S \text{ and } N_L = N_{0-2}, \quad (14)$$

and therefore, the following equation:

$$N_{0-2} R_L = \{-(N_n - N_{0-2})\tau_S/\tau_L + N_n\} R_S \quad (15)$$

should hold. Therefore, from equation (15), the equation:

$$N_n = N_{0-2}(R_L \tau_L - R_S \tau_S)/R_S \cdot (\tau_L - \tau_S) \quad (16)$$

is obtained. In other words, upon adjusting the gain of the DC amplifier 26, an S-T characteristic to satisfy equation (15) is obtainable, at which time $N_n$ is determined by the reel diameter, and the lowest useable rotational speed and the like.

Figure 2:
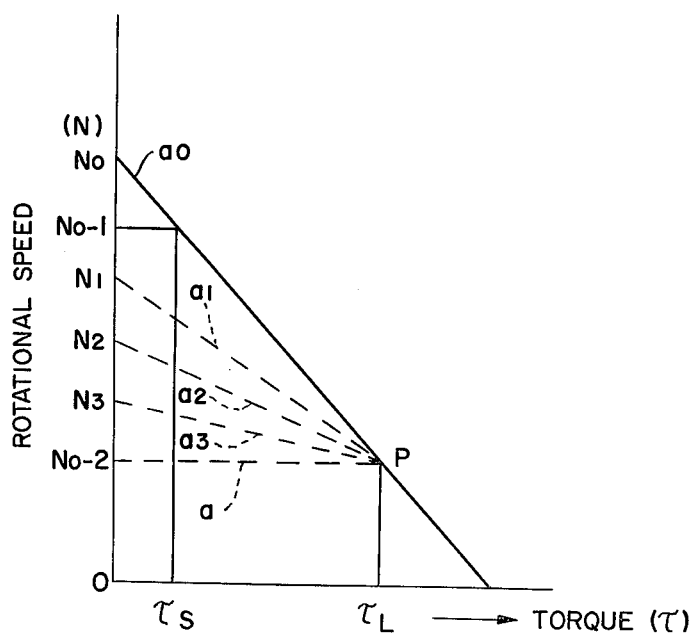
FIG. 2 is a graph showing the rotational speed—torque characteristics of a motor.
Figure 3:
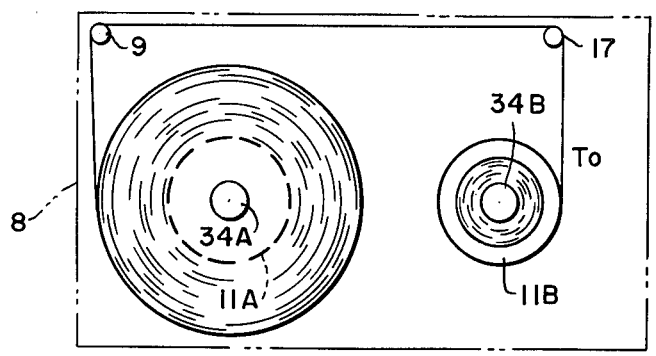
FIGS. 3 and 4 are plan views each showing an example of a cassette.
Figure 4:
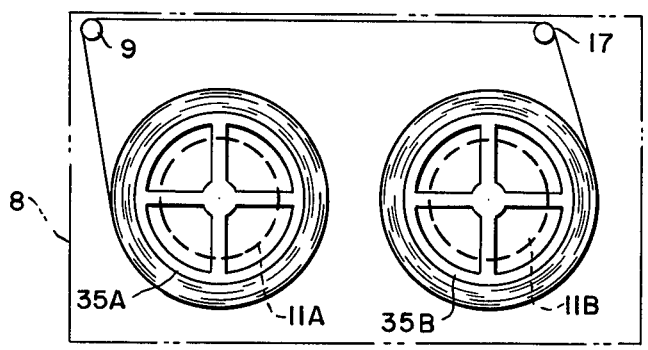

Thus, motor 16 is controlled to regularize the tape speed from the beginning to the end of the winding but it is actually difficult to allow the speed to meet the most optimum characteristic among those shown in FIG. 2, because various factors during the manufacturing process of the mechanism will change the torque $\tau_L$ for the maximum diameter of the wound tape for different decks so that the tape speed may shift somewhat from the set characteristic. The reel base for the cassette also differs in torque $\tau_L$ due to a difference in the frictional condition of the cassette bearings, whereby the tape speed also shifts from the set characteristic so as to create a problem in changing the speed in response to the diameter of the wound tape. Some magnetic tapes wound on the reel are different in length even when housed in the cassette of the same size as shown in FIGS. 3 and 4. Hence, if the speed control is set for the cassette shown in FIG. 3, the tape speed, when using the cassette shown in FIG. 4, becomes faster than that occurring when using the cassette shown in FIG. 3. Tape reels 35A and 35B, as shown in FIG. 4, are larger in size than tape reels 34A and 34B, and the diameters of the wound tape are not different at the beginning and the end of winding, and the tape tension $T_0$ at the tape feed side does not so change but becomes considerably smaller than that of the cassette shown in FIG. 3. Hence, the tape speed shifts from the set characteristic in FIG. 2 so as to be faster than that of the cassette shown in FIG. 3.

The present invention, even in the above case, is directed to keeping the tape speed so as not to change. Next, the embodiment of present invention will be detailed in accordance with FIG. 1, in which the speed information of magnetic tape 3 is derived by the control signal recorded on magnetic tape 3, whereby it is expected that the speed information of the control signal is fed to the speed control loop to thereby enable the tape speed control.

Hence, when the control signal reproduced from control magnetic head 9 is amplified by amplifier 29, waveform-shaped by waveform shaping circuit 33, and added to a speed information signal from FG at motor 16 by the adder 27, so that a speed control loop of motor 16→belt 19→flywheel 18→belt 21→pulley 20→idler 23→reel base 22→magnetic tape 3→control head 9→amplifier 29→waveform shaping circuit 33→adder 27→drive circuit 28→motor 16 is formed.

Alternatively, the waveform shaping circuit 33 may be replaced by a so-called discriminator conversion circuit which detects the frequency of control signal and converts it into a voltage change, thereby obtaining the same effect.

Therefore, the rotation of motor 16 can be controlled by the speed control loop formed by the signal from the motor FG and by that formed by the control signal.

Figure 5:
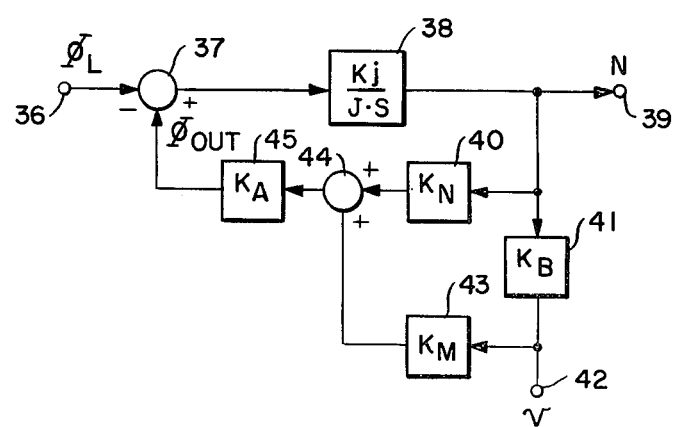
FIG. 5 is a block diagram of a speed control loop including the mechanism and circuit in FIG. 1.

Referring to FIG. 5, a control block of the control loop is shown, in which an input terminal 36 is given a load torque $\phi_L$ from pulley 17 of motor 16. If we assume that a torque generated by motor 16 is $\phi_{out}$, an adder block 37 can obtain a difference between $\phi_L$ and $\phi_{out}$; the difference is then multiplied by a conversion coefficient $Kj/J\cdot S$ to obtain the rotational speed N of the motor.

A block 38 shown by conversion coefficient $Kj/J\cdot S$ is identical with motor 16 itself, Kj being a constant; J, moment of inertia; S, Laplace transform factor of time. Adder block 37 may be deemed identical with the rotary shaft of the motor. An output terminal 39 of the rotational speed N is identical with motor pulley 17 and corresponds to the rotational speed thereof, but actually detects the rotational speed from FG at motor 16, the signal from FG at motor 16 passing through a conversion block 40 which converts the rotational speed into a voltage which is to an adder 44, the conversion block 40 corresponding to frequency detector 25 in FIG. 1 and generating a voltage corresponding to the rotational speed.

On the other hand, a block 41 represents the aforesaid line of belt 19→flywheel 18→belt 21→pulley 20→idler 23→reel base 22→magnetic tape 3, the line serving to convert the rotational speed N into tape speed $v$.

A block 43 represents the line of converting the speed into a voltage, and is identical with the line of amplifier 29→waveform shaping circuit 33 in FIG. 1. Both the aforesaid signals, after being added by adder 44, pass through a voltage-torque conversion block 45 for motor 16 itself and are fed to adder 37, thereby forming the control loop.

The relationship between the torque $\phi_L$ and the tape speed $v$ is expressed by the following equation:

$$\frac{v}{\phi_L} = \frac{K_B \frac{kj}{j}}{K_A \frac{Kj}{J}(K_N + K_B K_M) - S} \tag{17}$$

If it is assumed that:

$$K_A \frac{Kj}{J}(K_N + K_B K_M) >> S, \tag{18}$$

then equation (17) can be arranged as:

$$\frac{v}{\phi_L} = \frac{K_B}{K_A(K_N + K_B K_M)}. \tag{19}$$

The formula (18) is satisfied in a smaller range of rotational speeds N (S=$2\pi$N) of motor 16, which is deemed to be the rotational speeds within the range when the reel is driven. If:

$$K_N << K_B K_M \tag{20},$$

then equation (19) can be arranged to become the following equation:

$$\frac{v}{\phi_L} = \frac{1}{K_A \cdot K_M}, \tag{21}$$

where formula (20) should hold when the speed control gain is made larger by the control signal than that caused by FG at motor 16.

From the equation (21), when $K_A$ and $K_M$ are made larger, the speed is hardly affected by the fluctuation of load torque. For example, assuming $K_A \cdot K_M = 100$ g cm/cm/sec, the speed, even with the load torque less than 30 g·cm, changes only by 0.3 cm/sec. If the steady tape speed is 10 cm/sec, then the speed change is within 3%, whereby an effect actually is almost negligible which is applied on a picture of playback video during the cue play and review play of the magnetic tape.

The adjustment of a loop gain of the speed control loop using the control signals is such that when the pulse width is made constant during the waveform shaping of the control signal, then the pulse amplitude is changed to enable the adjustment of the gain, and when the pulse amplitude is made constant, then the pulse width is changed to enable the adjustment of the gain. Hence, the formula (20) should hold under the above adjustment.

The motor 16 is controlled as above to make it possible to regularize the tape speed from the beginning to the end of winding. Furthermore, a method of adding a phase control loop to the speed control loop in order to regularize the tape speed, will be detailed.

The tape speed information, as mentioned above, depends upon a control signal recorded on the tape, so that the motor 16, as shown in FIG. 1, is controlled by a control signal derived by adding a phase error signal and the speed control signal, the phase error signal being derived by a phase-comparison of the reference signal with the playback control signal from amplifier 29, thereby making the tape speed accurately constant an synchronizing the reference signal with the control signal.

In detail, referring to the FIG. 1 block diagram, the control signal output by the control head 9 is amplified through amplifier 29 and then fed to a frequency divider 30, which is arranged to set a dividing ratio by means of a necessary tape speed. In other words, the phase comparator 32 compares the control signal with the oscillation frequency f (in the Japanese-U.S. standard television system, usually set to a frame frequency of 29.95 Hz) of the reference oscillator 31, thereby obtaining the phase error signal. When the playback is performed at a tape speed W times (from several to several tens times) larger than that used during the recording of the control signal, the playback control signal will increase in frequency following the above. Hence, the control signal is divided by 1/W so as to coincide with the reference signal. On the contrary, the frequency division is replaced by making the frequency of reference oscillator 31 W times larger than that used during the recording, which is the same as the above. The phase error signal of phase comparator 32 passes through the adder 27 and is fed to the motor drive circuit 28 to thereby form the phase control loop, the control signal being in synchronism with the signal from reference oscillator 31, thus regularizing the tape speed.

Figure 6:
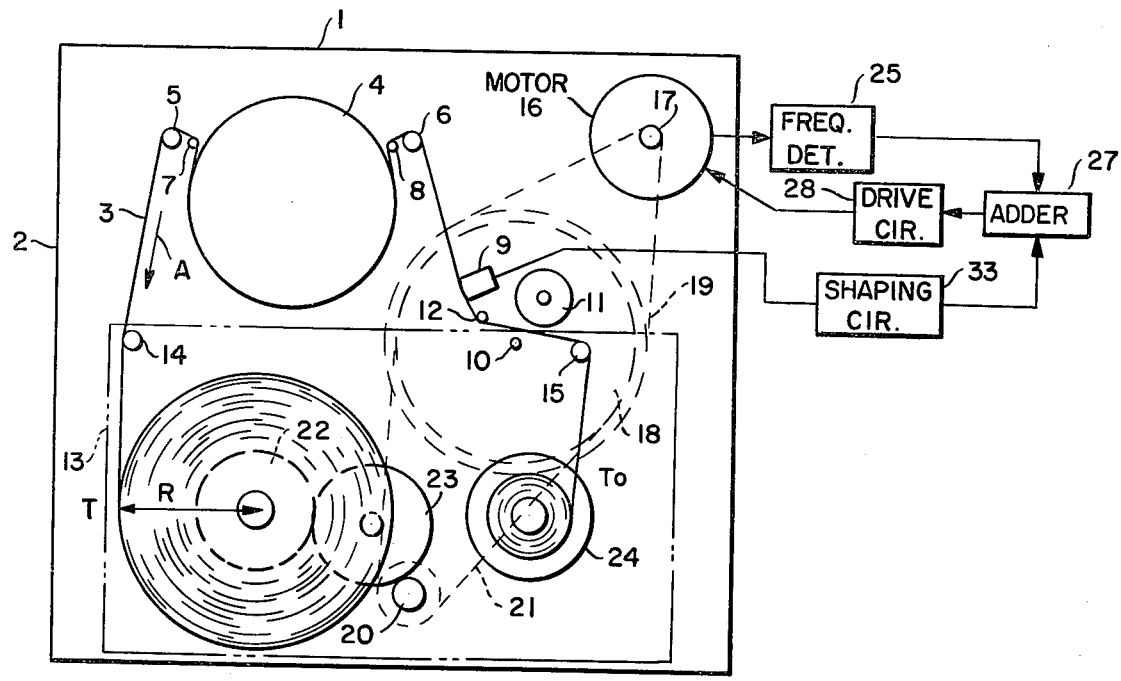
FIG. 6 is a plan view including a block diagram in a principal portion of another embodiment of a magnetic tape reproducing apparatus according to the present invention.
Figure 7:
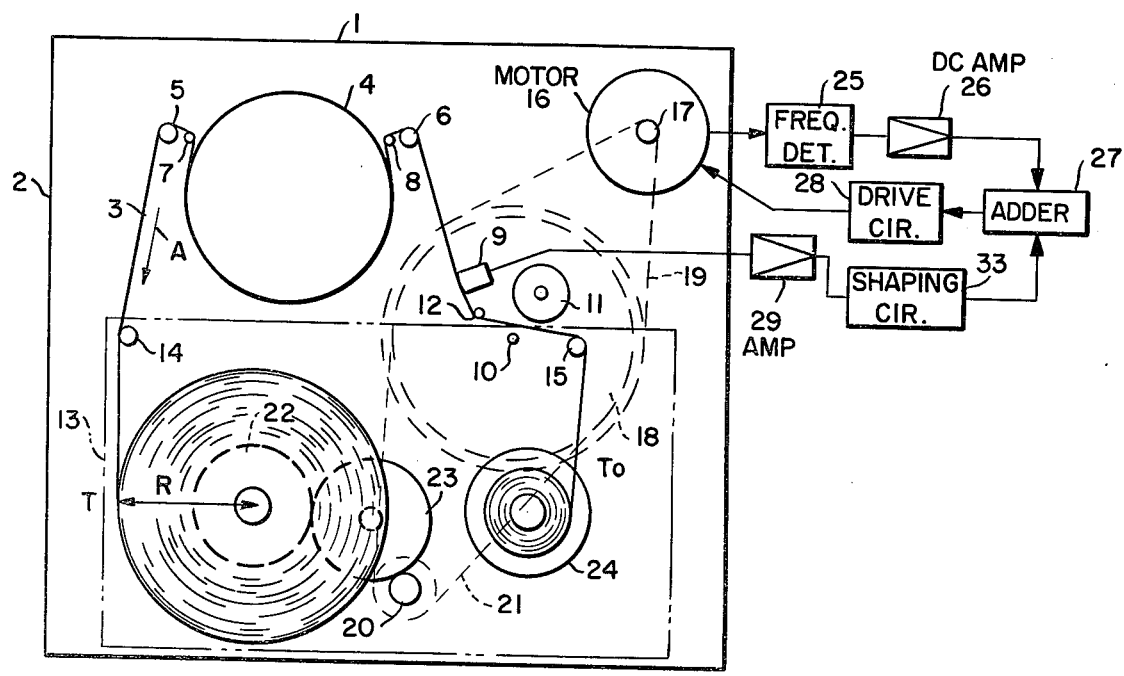
FIG. 7 is a plan view including a block diagram in a principal portion of still another embodiment of a magnetic tape reproducing apparatus according to the present invention.
Figure 8:
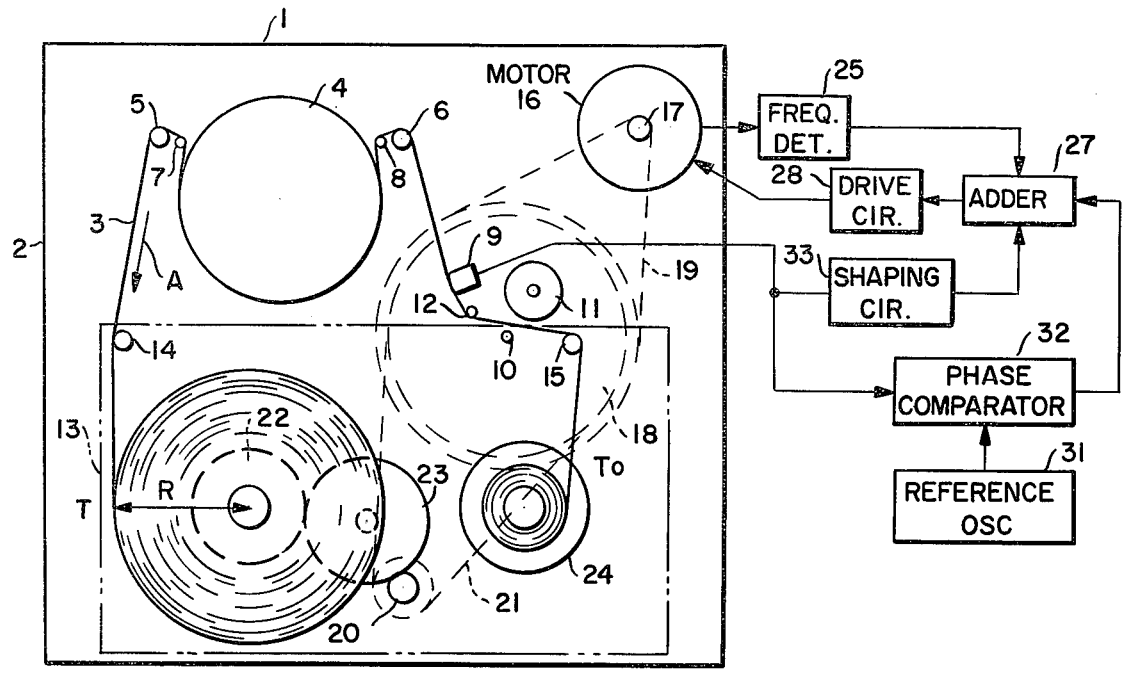
FIG. 8 in a plan view including a block diagram in a principal portion of a further embodiment of a magnetic tape reproducing apparatus according to the present invention.
Figure 9:
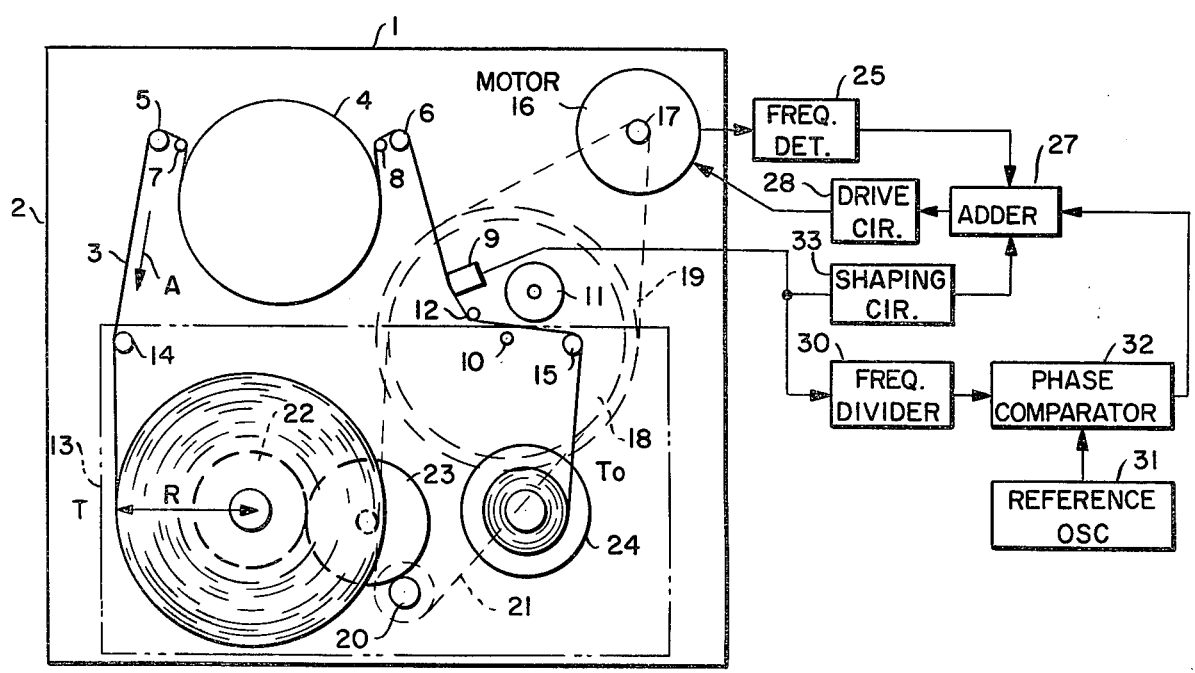
FIG. 9 is a plan view including a block diagram in a principal portion of a still further embodiment of a magnetic tape reproducing apparatus according to the present invention.

The configuration of the magnetic tape reproducing apparatus can be arranged in other ways without changing the principal idea of the present invention. FIG. 6 is a plan view including a block diagram of a principal portion of another embodiment of a magnetic tape reproducing apparatus according to the present invention. FIG. 7 is a plan view including a block diagram of a principal portion of still another embodiment of a magnetic tape reproducing apparatus according to the present invention. FIG. 8 is a plan view including a block diagram of a principal portion of a further embodiment of a magnetic tape reproducing apparatus according to the present invention. FIG. 9 is a plan view including a block diagram of a principal portion of a still further embodiment of a magnetic tape reproducing apparatus according to the present invention. Detailed descriptions of these embodiments are omitted, because the operations of these embodiments can be easily understood from the foregoing descriptions.

As seen from the above, the present invention is directed to the provision of an effective control for the motor in a magnetic tape recording and reproducing apparatus, such as a VTR, the motor rotatably driving the reel base during the cue play and review play during the playback. The control detects the rotational speed of the motor itself to form the speed control loop, and further forms the speed control loop by means of the control signal recorded on the magnetic tape, thereby being effective in rapid feed and rewinding playback, the so-called the cue play and review play, in the VTR or the like and having an extremely large industrial value.

What is claimed is:

1. A magnetic tape reproducing apparatus comprising:
   reel bases for winding-up a magnetic tape thereon;
   a motor whose rotational speed is controllable for rotatably driving said reel bases;
   a motor driving means for driving said motor;
   a detecting means for detecting the rotational speed of said motor and for providing a motor speed information signal corresponding thereto;
   a magnetic head for reproducing a control signal recorded on said magnetic tape;
   a waveform shaping means for shaping a waveform of said control signal so as to obtain a tape speed information signal corresponding to the speed of said magnetic tape; and
   an adding means for adding said tape speed information signal obtained from said waveform shaping means and said motor speed information signal obtained from said detecting means, a signal obtained from said adding means being fed to said motor through said motor driving means so as to form a speed control loop, thereby controlling the tape speed so as to be substantially constant when a cue play or review play is performed.

2. A mangetic tape reproducing apparatus according to claim 1, further comprising:
   a reference signal generating means for generating a reference signal and a phase-comparison means for comparing the phase of said control signal recorded on said magnetic tape with said reference signal and for outputting a phase error signal which is added by said adding means to said tape and motor speed information signals, so that said signal fed to said motor further includes said phase error signal.

3. A magnetic tape recording apparatus according to claim 2, further comprising a frequency dividing means operatively connected between said magnetic head and said phase-comparison means for dividing said control signal frequency by 1/n, n being an integer, when the frequency of said reference signal is the same frequency as that of a standard television signal, wherein the value of n is changed so as to thereby change speed for said cue play or review play.

4. A magnetic tape reproducing apparatus comprising:
   reel bases for winding-up a magnetic tape thereon;
   a motor whose rotational speed is controllable for rotatably driving said reel bases;
   a motor driving means for driving said motor;
   a detecting means for detecting the rotational speed of said motor and for providing a motor speed information signal corresponding thereto;
   a magnetic head for reproducing a control signal recorded on said magnetic tape;
   a waveform shaping means for shaping a waveform of said control signal so as to obtain a tape speed information signal corresponding to the speed of said magnetic tape; and
   an adding means for adding said tape speed information signal obtained from said waveform shaping means and said motor speed information signal obtained from said detecting means, a signal obtained from said adding means being fed to said motor through said motor driving means so as to form a speed control loop, thereby controlling the tape speed so as to be substantially constant when a cue play or review play is performed;

wherein said speed control loop further comprises:
a first gain controlling means for controlling a loop gain a of said speed control loop at a side of said detecting means for detecting rotational speed of said motor, a second gain controlling means for controlling a loop gain b of said speed control loop at a side of said waveform shaping means for shaping said control signal, said loop gains a and b being selected such that a<<b.

5. A magnetic tape reproducing apparatus comprising:
reel bases for winding-up a magnetic tape thereon;
a motor whose rotational speed is controllable for rotatably driving said reel bases;
a motor driving means for driving said motor;
a detecting means for detecting the rotational speed of said motor and for providing a motor speed information signal corresponding thereto;
a magnetic head for reproducing a control signal recorded on said magnetic tape;
a waveform shaping means for shaping a waveform of said control signal so as to obtain a tape speed information signal corresponding to the speed of said magnetic tape; and
an adding means for adding said tape speed information signal obtained from said waveform shaping means and said motor speed information signal a detecting means for detecting the rotational speed of said motor and for providing a motor speed information signal corresponding thereto;
a magnetic head for reproducing a control signal recorded on said magnetic tape;
a conversion means for converting a frequency of said control signal into a voltage or current which is a tape speed information signal corresponding to the speed of said magnetic tape;
and an adding means for adding said motor speed information signal obtained from said detecting means and said tape speed information signal obtained from said conversion circuit, a signal obtained from said adding means being fed to said motor through said motor driving means so as to form a speed control loop, thereby controlling the tape speed so as to be substantially constant when a cue play or review play is performed;
further comprising:
a reference signal generating means for generating a reference signal and a phase-comparison means for comparing the phase of said control signal recorded on said magnetic tape with said reference signal and for outputting a phase error signal which is added by said adding means to said tape and motor speed information signals, so that said signal fed to said motor further includes said phase error